(12) United States Patent
Lin et al.

(10) Patent No.: US 11,361,698 B2
(45) Date of Patent: Jun. 14, 2022

(54) ELECTRONIC DEVICE AND METHOD OF BURN-IN PREVENTION FOR ELECTRONIC DEVICE

(71) Applicant: GIGA-BYTE TECHNOLOGY CO., LTD., New Taipei (TW)

(72) Inventors: Hou-Yuan Lin, New Taipei (TW); Ching-Hung Chao, New Taipei (TW); Po-Chang Tseng, New Taipei (TW); Hung-Yen Chen, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 17/035,890

(22) Filed: Sep. 29, 2020

(65) Prior Publication Data

US 2021/0201742 A1    Jul. 1, 2021

(30) Foreign Application Priority Data

Dec. 31, 2019 (TW) ................................. 108148484

(51) Int. Cl.
*G09G 3/20* (2006.01)

(52) U.S. Cl.
CPC ......... *G09G 3/2003* (2013.01); *G09G 3/2092* (2013.01); *G09G 2320/046* (2013.01); *G09G 2354/00* (2013.01)

(58) Field of Classification Search
CPC ............... G09G 3/2003; G09G 3/2092; G09G 2320/046; G09G 2354/00; G09G 5/026;
(Continued)

(56) References Cited

U.S. PATENT DOCUMENTS

| 7,952,554 B2 * | 5/2011 | Awakura ................ G09G 5/397 345/100 |
| 2007/0046815 A1 | 3/2007 | Lee |

(Continued)

FOREIGN PATENT DOCUMENTS

| CN | 1925579 A | 3/2007 |
| CN | 101308625 A | 11/2008 |

(Continued)

OTHER PUBLICATIONS

Extended European Search Report for European Application No. 20209374.6, dated May 18, 2021.
(Continued)

*Primary Examiner* — Antonio A Caschera
(74) *Attorney, Agent, or Firm* — Birch, Stewart, Kolasch & Birch, LLP

(57) ABSTRACT

An electronic device includes: a display panel and a host. The host is electrically connected to the display panel, and includes a processing unit and a graphics processing unit. The processing unit executes a driver program of the graphics processing unit and a specific program to render a display image of the specific program, wherein the display image includes a user interface. The processing unit obtains position information about a static area of the user interface. In response to the processing unit obtaining the position information about the static area of the user interface, the graphics processing unit performs a burn-in-prevention process on the static area via the driver program to generate an output image, and transmits the output image to the display panel for displaying.

6 Claims, 8 Drawing Sheets

(58) Field of Classification Search
CPC .... G09G 5/377; G09G 5/397; G09G 2340/12; G09G 2320/0686; G06F 2203/04804
See application file for complete search history.

(56) References Cited

U.S. PATENT DOCUMENTS

2016/0260413 A1\* 9/2016 You .......................... G09G 5/10
2018/0012332 A1   1/2018 Ishihara et al.
2018/0059911 A1\* 3/2018 Kim ...................... G06F 3/0481

FOREIGN PATENT DOCUMENTS

| CN | 102034458 A | 4/2011 |
| EP | 3480805 A1 | 5/2019 |
| TW | 201814476 A | 4/2018 |

OTHER PUBLICATIONS

Taiwanese Office Action and Search Report for Taiwanese Application No. 108148484, dated Jan. 22, 2021.

\* cited by examiner

ELECTRONIC DEVICE AND METHOD OF BURN-IN PREVENTION FOR ELECTRONIC DEVICE

CROSS REFERENCE TO RELATED APPLICATIONS

This Application claims priority of Taiwan Patent Application No. 108148484, filed on Dec. 31, 2019, the entirety of which is incorporated by reference herein.

BACKGROUND OF THE INVENTION

Field of the Invention

The invention relates to display apparatuses, and, in particular, to an electronic device and a method of burn-in prevention for an electronic device.

Description of the Related Art

Currently, some display apparatuses on the market, such as televisions or computer monitors, use liquid-crystal display (LCD) panels, light-emitting diode (LED) panels, or organic light-emitting diode (OLED) panels. However, these types of panels will cause the aging of pixels in different regions to be different, based on differences in usage time and brightness. In some areas, the pixels are lit for a longer time, and they will age faster and have lower brightness than other blocks, which will cause local afterimages on the screen. The backlight module of an LCD panel is usually a whole board, so even if the brightness is reduced, it is less easy to detect, but it still has a problem with screen burn-in. However, each pixel in the OLED panel has the characteristics of self-illumination, and because the display apparatus often has static toolbars or icons, the pixels in these areas will age faster and will have different colors as the pixels around them, so it will cause screen burn-in.

BRIEF SUMMARY OF THE INVENTION

In view of the above, an electronic device and a method of burn-in prevention for an electronic device are provided to solve the aforementioned problems.

In an exemplary embodiment, an electronic device is provided. The electronic device includes: a display panel and a host. The host is electrically connected to the display panel, and comprises a processing unit and a graphics processing unit. The processing unit executes a driver program of the graphics processing unit and a specific program to render a display image of the specific program, wherein the display image comprises a user interface. The processing unit obtains position information about a static area of the user interface. In response to the processing unit obtaining the position information about the static area of the user interface, the graphics processing unit performs a burn-in-prevention process on the static area via the driver program to generate an output image, and transmits the output image to the display panel for displaying.

In some embodiments, the burn-in-prevention process utilizes the graphics processing unit to generate a translucent window corresponding to the static area, and the translucent window has a transparency value between 0 and 1, and the graphics processing unit performs image blending on the translucent window and an image of the static area according to the transparency value to generate an output image.

In some other embodiments, the burn-in-prevention process utilizes the driver program to reduce brightness of pixels in the static area as a whole within a first predetermined range, and/or to adjust values of red subpixels, green subpixels, and blue subpixels of the pixels in the static area within a second predetermined range.

In some embodiments, the position information about the static area is obtained by the processing unit when the specific program in the current window is detected, or is obtained from an area that has been selected by a user.

In another exemplary embodiment, a method of burn-in prevention for an electronic device is provided. The electronic device comprises a display panel and a host, and the host comprises a processing unit and a graphics processing unit. The method includes the following steps: utilizing the processing unit to execute a driver program of the graphics processing unit and a specific program to render a display image of the specific program, wherein the display image comprises a user interface; utilizing the processing unit to obtain position information about a static area of the user interface; and in response to the processing unit obtaining the position information about the static area of the user interface, utilizing the graphics processing unit to perform a burn-in-prevention process on the static area via the driver program to generate an output image, and transmitting the output image to the display panel for displaying.

In yet another exemplary embodiment, an electronic device is provided. The electronic device includes: a display panel and a host. The host is electrically connected to the display panel, and comprises a processing unit and a graphics processing unit. The processing unit executes a driver program of the graphics processing unit and a specific program to render a display image of the specific program, wherein the display image comprises a user interface. The processing unit obtains position information about a static area of the user interface, and transmits the display image and the position information about the static area to the display controller. The display controller generates an on-screen-display (OSD) mask of a burn-in-prevention area corresponding to the static area according to the position information about the static area, superimposes the OSD mask on the static area of the display image to generate an output image, and transmits the output image to the display panel for displaying.

In some embodiments, wherein the OSD mask has a transparency value between 0 and 1, and the display controller performs image blending on the OSD mask and the image of the burn-in-prevention area according to the transparency value to generate the output image.

In some other embodiments, the display controller uses the OSD mask to reduce brightness of pixels in the static area as a whole within a first predetermined range, and/or to adjust values of red subpixels, green subpixels, and blue subpixels of the pixels in the static area as a whole within a second predetermined range.

In yet another exemplary embodiment, a method of burn-in prevention in an electronic device is provided. The electronic device comprises a display apparatus and a host, and the display apparatus comprises a display panel and a display controller, and the host comprises a processing unit and a graphics processing unit. The method includes the following steps: utilizing the processing unit to execute a driver program of the graphics processing unit and a specific program to render a display image of the specific program, wherein the display image comprises a user interface; utilizing the processing unit to obtain position information about a static area of the user interface, and to transmit the display image and the position information about the static area to the display controller; and utilizing the display controller to generate an on-screen-display (OSD) mask of a burn-in-prevention area corresponding to the static area according to the position information about the static area, to superimpose the OSD mask on the static area of the display image to generate an output image, and to transmit the output image to the display panel for displaying.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1A:
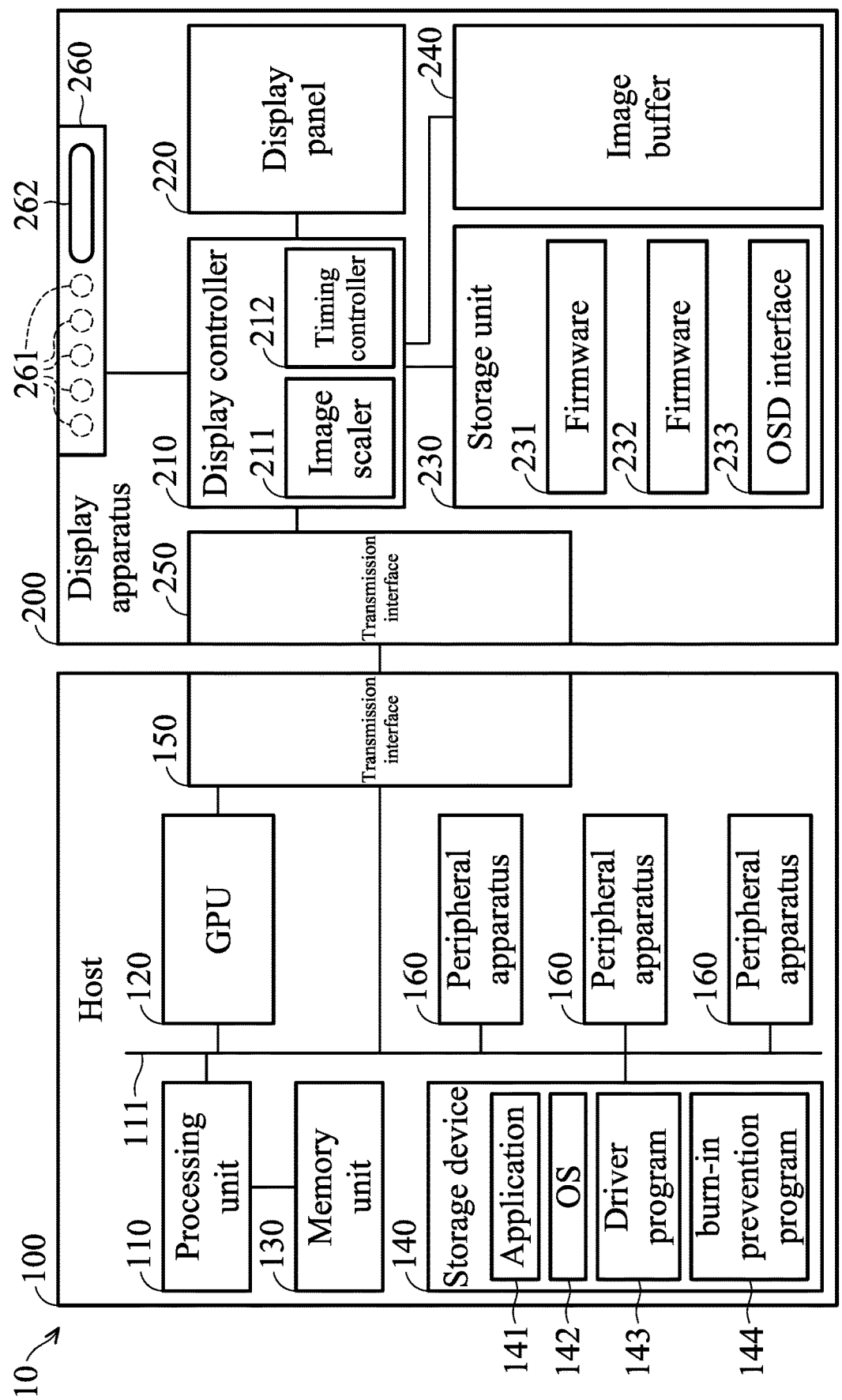
FIG. 1A is a block diagram of an electronic device in accordance with an embodiment of the invention.

FIG. 1A is a block diagram of an electronic device in accordance with an embodiment of the invention. The electronic device 10, for example, may be a personal computer or server equipped with a display apparatus. As illustrated in FIG. 1A, the electronic device 10 includes a host 100 and a display apparatus 200, wherein the host 100 has a signal connection to the display apparatus 200. For example, the host 100 may include a processing unit 110, a graphics processing unit (GPU) 120, a memory unit 130, a storage device 140, one or more transmission interfaces 150, and one or more peripheral apparatuses 160. The processing unit 110, graphics processing unit 120, memory unit 130, storage device 140, transmission interfaces 150, and peripheral apparatuses 160 may be coupled to each other via the system bus 111. The processing unit 110, for example, may be a central processing unit (CPU), a general-purpose processor, etc., but the invention is not limited thereto. The graphics processing unit 120, for example, may be a graphics processing unit on a video adapter or integrated into the processing unit 110.

The memory unit 130 may be a random access memory such as a static random access memory (SRAM) or a dynamic random access memory (DRAM), but the invention is not limited thereto. The storage device 140 may be a non-volatile memory such as a hard-disk drive, a solid-state disk (SSD), a flash memory, or a read-only memory (ROM), but the invention is not limited thereto.

The transmission interface 150 may include wired transmission interfaces and/or wireless transmission interfaces. The wired transmission interfaces may include: high definition multimedia interface (HDMI), DisplayPort (DP) interface, embedded DisplayPort (eDP) interface, Universal Serial Bus (USB) interface, USB Type-C interface, Thunderbolt interface, digital video interface (DVI), video graphics array (VGA) interface, general purpose input/output (GPIO) interface, universal asynchronous receiver/transmitter (UART) interface, serial peripheral interface (SPI), inter-integrated circuit (I2C) interface, or a combination thereof. The wireless transmission interfaces may include Bluetooth, WiFi, near-field communication (NFC) interface, etc., but the invention is not limited thereto. The peripheral apparatus 160, for example, may include input apparatuses such as a keyboard, a mouse, a touch pad, etc., but the invention is not limited thereto.

For example, the storage device 140 may store one or more applications 141, an operating system 142 (e.g., Windows, Linux, MacOS, etc.), a driver program 143, and a burn-in prevention program 144. The processing unit 110 may load the operating system 142, the driver program 143, the burn-in prevention program, and one of the applications 141 to the memory unit 130 for execution. The driver program 143, for example, may be a graphics driver of the graphics processing unit 120, and be configured to control graphics operations performed by the graphics processing unit 120. The burn-in prevention program 144 is used to allow a user to control the on-screen-display menu of the display apparatus 200, and the details will be described later. The graphics processing unit 120 may, for example, perform graphics processing on the application being executed by the processing unit 110 to generate an image signal that includes one or more images, and transmit the image signal to the display apparatus 200 via one of the transmission interfaces 150 (e.g., HDMI or DisplayPort interface).

The display apparatus 200, for example, may be a flat panel display, a television, a projector, or a computer monitor, but the invention is not limited thereto. The display apparatus 200 includes a display controller 210, a display panel 220, a storage unit 230, an image buffer 240, one or more transmission interface 250, and an input interface 260. The transmission interface 250 may include wired transmission interfaces and/or wireless transmission interfaces. The wired transmission interfaces may include: high definition multimedia interface (HDMI), DisplayPort (DP) interface, embedded DisplayPort (eDP) interface, Universal Serial Bus (USB) interface, USB Type-C interface, Thunderbolt interface, digital video interface (DVI), video graphics array (VGA) interface, general purpose input/output (GPIO) interface, universal asynchronous receiver/transmitter (UART) interface, serial peripheral interface (SPI), inter-integrated circuit (I2C) interface, or a combination thereof. The wireless transmission interfaces may include Bluetooth, WiFi, near-field communication (NFC) interface, etc., but the invention is not limited thereto. The peripheral apparatus 160, for example, may include input apparatuses such as a keyboard, a mouse, a touch pad, etc., but the invention is not limited thereto.

The display controller 210, for example, may be implemented by an application-specific integrated circuit (ASIC), a system-on-chip (SoC), a processor, or a microcontroller, but the invention is not limited thereto.

The display panel 220, for example, may be a liquid-crystal display panel, a light-emitting diode (LED) display panel, or an organic light-emitting diode (OLED) display panel, but the invention is not limited to the three aforementioned types of display panels.

The storage unit 230, for example, may be a non-volatile memory such as a read-only memory (ROM), an erasable programmable read-only memory (EPROM), an electrically erasable programmable read-only memory (EEPROM), etc., but the invention is not limited thereto. The storage unit 230 is configured to store firmware 231 associated with the display apparatus 200. The storage unit 230 may be disposed outside the display controller 210, or alternatively integrated into the display controller 210.

The firmware 231, for example, may include extended display identification data (EDID) and display settings of the display apparatus 200, and one or more on-screen-display (OSD) interfaces 233. The EDID, for example, may include information such as the manufacturer, product name, resolution, frames per second (FPS) of the display apparatus 200. The display settings of the display apparatus 200 may include the brightness, contrast, sharpness, color temperature of the display apparatus 200. The firmware 232 is used to control the OSD interfaces 233 of the display apparatus 200 via the peripheral device 160 of the host 100.

In an embodiment, the display controller 210 may read the firmware 231 and 232 and program code of the OSD interface 233 stored in the storage unit 230 via a bus (e.g., an I2C bus), and configure the corresponding display parameters. In addition, the display controller 210 may transmit the EDID of the display apparatus 200 to the host 100 via one of the transmission interfaces 250 (e.g., may be an image-transmission channel or a data-transmission channel), so that the processing unit 110 and the graphics processing unit 120 in the host 100 may configure the resolution and corresponding synchronization signals of the output image signal based on the EDID. The OSD interfaces 233, for example, may include an OSD menu and corresponding options, an information dashboard, a timer, a counter, a crosshair, a specific symbol, a specific color, a specific text, or a combination thereof, but the invention is not limited thereto.

The image buffer 240, for example, may be a volatile memory (e.g., a DRAM) or a non-volatile memory (e.g., a flash memory), that is configured to store output images to be displayed on the display panel 220, wherein the host 100 or the display controller 210 may, according to an OSD control signal generated by the host 100, overwrite a specific region of the image signal stored in the image buffer 240 with the one or more OSD interfaces 232.

The input interface 260 is configured to control the OSD menu of the display apparatus 200. The input interface 260 may be implemented by one or more physical buttons 261 or a five-way joystick 262 to implement instructions such as up, down, left, right, and confirm.

In an embodiment, when the user performs an operation in one direction of the five-way joystick 262 (or presses one of the physical buttons 261), the display controller 210 may read the firmware 232 and the program code or firmware of the OSD menu and corresponding options of the OSD interfaces 233 from the storage unit 230, and display the OSD menu and corresponding options on the display panel 220. In an embodiment, the user may perform operations on the input interface 260 to control the OSD menu of the display apparatus to adjust the brightness, contrast, sharpness, color temperature, or activate or deactivate other interfaces among the OSD interfaces 233. In another embodiment, the activating and deactivating of the OSD interfaces 233 and the content displayed on the OSD interface 233, for example, can be controlled by the peripheral device 160 of the host 100, where the details will be described later.

For example, the firmware 231 can be regarded as the default firmware of the display apparatus 200, and the user may control the settings of the OSD interface 233 displayed on the display apparatus 200 via the five-way joystick 262 (or the physical buttons 261). If the firmware 231 detects an OSD control signal transmitted from the host 100, the display controller 210 will read the firmware 232 to perform subsequent operations on the OSD interface 233, such as performing operations on the OSD interface 233 of the display apparatus 200 via the peripheral device 160 of the host 100.

In an embodiment, the display controller 210 may include an image scalar 211 and a timing controller 212. The display controller 210 may receive the image signal from the host 100 and/or another signal from other hosts via one of the transmission interfaces 250, and the image scalar 211 may perform an image-scaling process and/or image-overlaying process on the received image signals to fit the resolution of the display panel 220, and store the images (e.g., output images) generated by the image-scaling process to the image buffer 240. The timing controller 212 may control the display panel 220 to read the output images from the image buffer 240 for displaying.

In another embodiment, the display controller 210 may include the timing controller 212, and the resolution of the image signal from the host 100 may fit that of the display panel 220. Thus, the display controller 210 may directly store the received image signal from the host 100 to the image buffer 240 without performing the image-scaling process. The timing controller 212 may read the output images stored in the image buffer 240, and control the display panel 220 to display the output images.

Figure 1B:
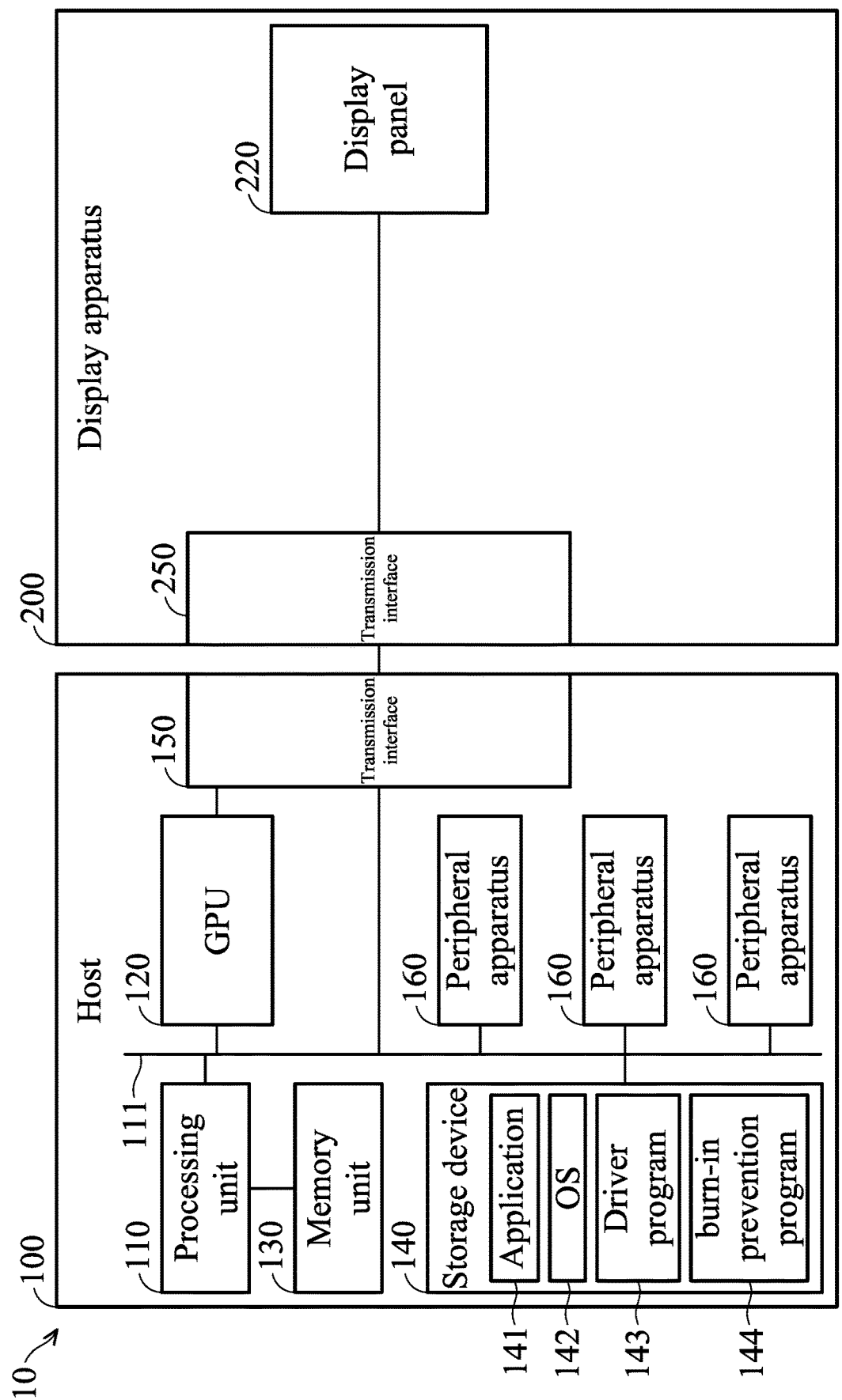
FIG. 1B is a block diagram of an electronic device in accordance with another embodiment of the invention.

FIG. 1B is a block diagram of an electronic device in accordance with another embodiment of the invention.

In another embodiment, as depicted in FIG. 1B, the electronic device 10, for example, may be a laptop computer, and the display apparatus 200 may be the flat display provided with the laptop computer. The components in FIG. 1B are similar to those in FIG. 1A. The difference is that the display panel 220 in the display apparatus 200 is directly driven by the driver program 143 of the graphics processing unit 120. For example, in the embodiment, the transmission interfaces 150 and 250 may be embedded DisplayPort (eDP) interfaces or low-voltage differential signal (LVDS) interfaces, and thus the driver program 143 of the graphics processing unit 120 may directly drive the display panel 220. The display panel 220, for example, may be an LCD panel, LED panel, or OLED panel. For convenience of description, the electronic device 10 shown in FIG. 1A is taken as an example in the following embodiments.

Figure 2A:
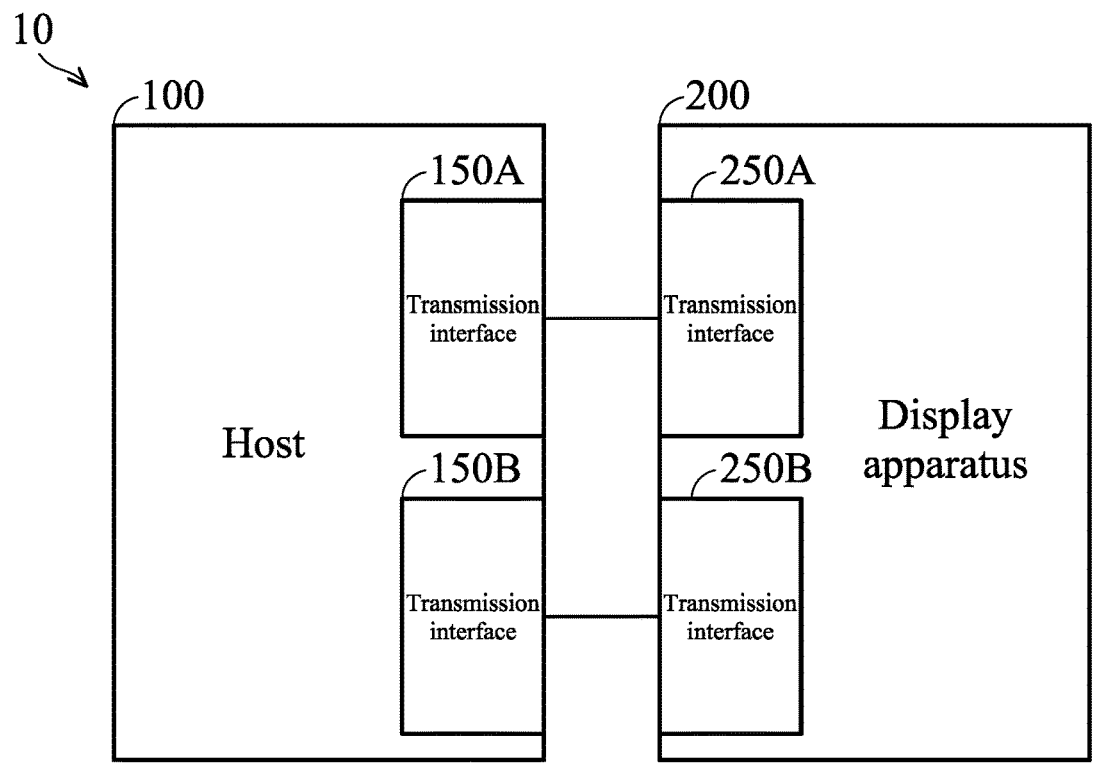
FIGS. 2A and 2B are diagrams of connection between the host and display apparatus in the electronic device in accordance with an embodiment of the invention.
Figure 2B:
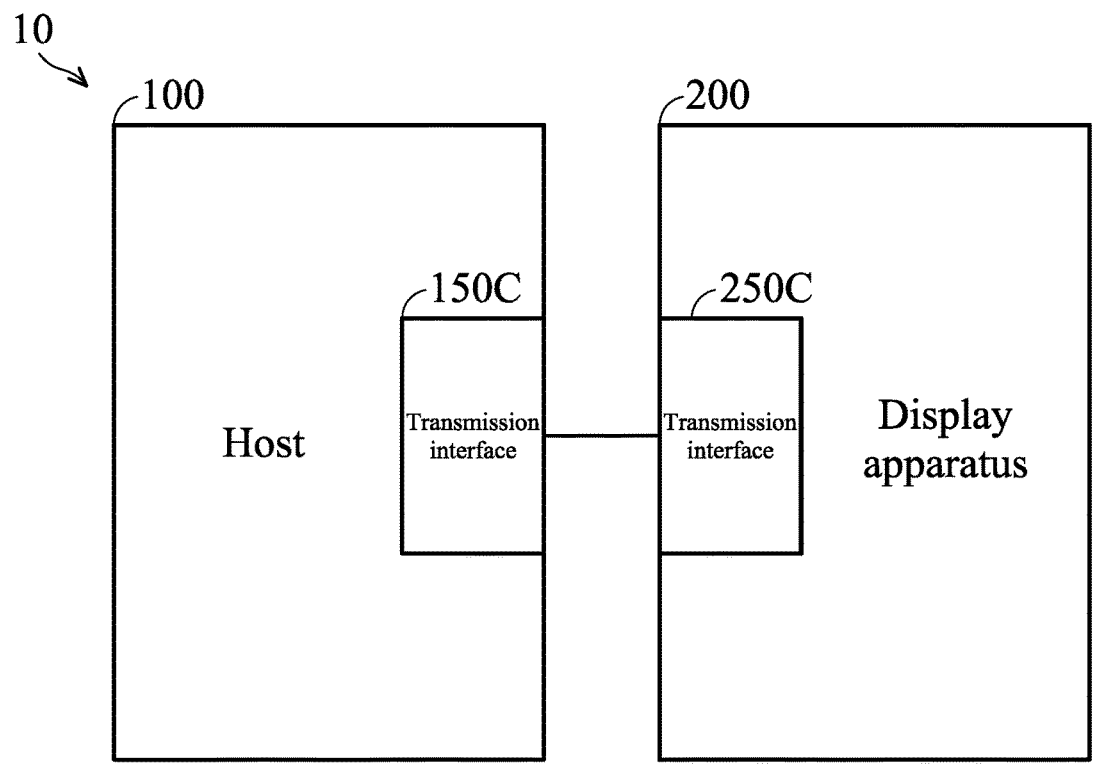

FIGS. 2A and 2B are diagrams of connection between the host and display apparatus in the electronic device in accordance with an embodiment of the invention.

In an embodiment, as depicted in FIG. 2A, the image signal generated by the graphics processing unit 120 of the host 100 may be transmitted to the display controller 210 of the display apparatus 200 via the transmission interface 150A (e.g., an HDMI interface) of the host 100 and the transmission interface 250A (e.g., an HDMI interface) of the display apparatus 200. For example, the transmission channel between the transmission interfaces 150A and 250A can be regarded as an image-transmission channel.

In addition, the processing unit 110 of the host 100 is capable of detecting a specific event on the host 100, and generating an OSD control signal in response to the detected specific event. For example, the specific event may be a specific input signal received by one of the peripheral apparatuses 160 of the host 100, such as a specific button or a combination of buttons input from the keyboard, and each of the OSD interfaces 233 of different types may correspond to a respective specific button or combination of buttons. In addition, the host 100 may transmit the OSD control signal to the display apparatus 200 via the transmission interface 150B (e.g., a USB interface) of the host 100 and the corresponding transmission interface 250B (e.g., a USB interface) of the display apparatus 200. For example, the transmission channel between the transmission interfaces 150B and 250B can be regarded as a data-transmission channel or a control-signal-transmission channel.

In another embodiment, as depicted in FIG. 2B, the image signal generated by the graphics processing unit 120 of the host 100 can be transmitted to the display controller 210 of the display apparatus 200 via the transmission interface 150C (e.g., a USB Type-C interface) of the host 100 and the corresponding transmission interface 250C (e.g., a USB Type-C interface) of the display apparatus 200. In addition, the processing unit 110 of the host 100 may detect a specific event on the host 100, and generate an OSD control signal in response to the detected specific event. For example, the specific event may be a specific input signal received by one of the peripheral apparatuses 160 of the host 100, such as a specific button or a combination of buttons input from the keyboard, and each of the OSD interfaces 232 of different types may correspond to a respective specific button or combination of buttons. It should be noted that the USB Type-C protocol may support Hi-Speed and SuperSpeed data transmission in addition to the image/video transmission (e.g., supporting the DisplayPort or HDMI standards). That is, the image-transmission channel and the data-transmission channel can be integrated into the USB Type-C interface. Accordingly, the host 100 may transmit the OSD control signal to the display apparatus 200 via the transmission interface 150C (e.g., a USB Type-C interface) of the host 100 and the corresponding transmission interface 250C (e.g., a USB Type-C interface) of the display apparatus 200.

For convenience of description, the following embodiments are described with the hardware configuration shown in FIG. 2A, but can also be implemented by the hardware configuration shown in FIG. 2B in a similar manner. In an embodiment, the user may press a specific combination of buttons (e.g., CTRL + ALT + G, not limited) on the keyboard to activate the OSD-menu control mode of the host 100. For example, when the host 100 has enter the OSD-menu control mode, the OSD menu displayed on the display apparatus 200 can be controlled by the peripheral apparatus 160 of the host 100, where the details of the OSD-menu control mode will be described later.

Figure 3A:
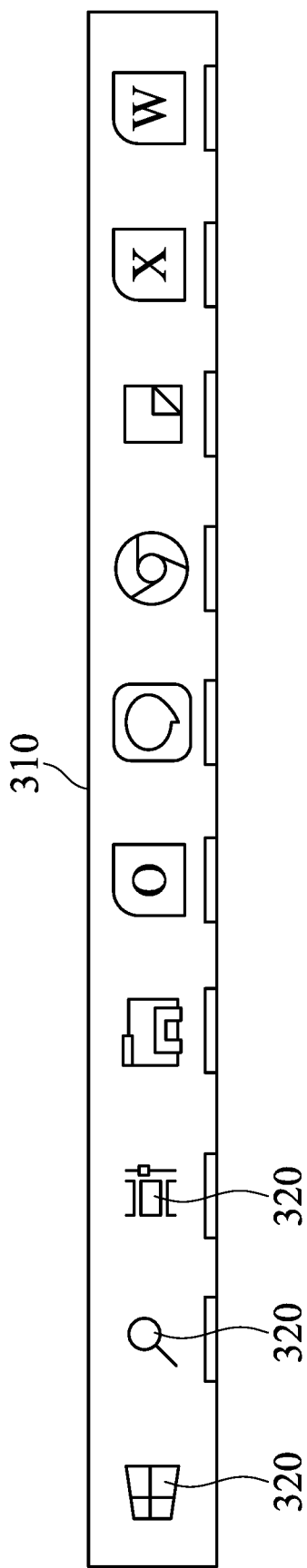
FIGS. 3A and 3B are diagrams of a desktop screen in accordance with an embodiment of the invention.
Figure 3B:
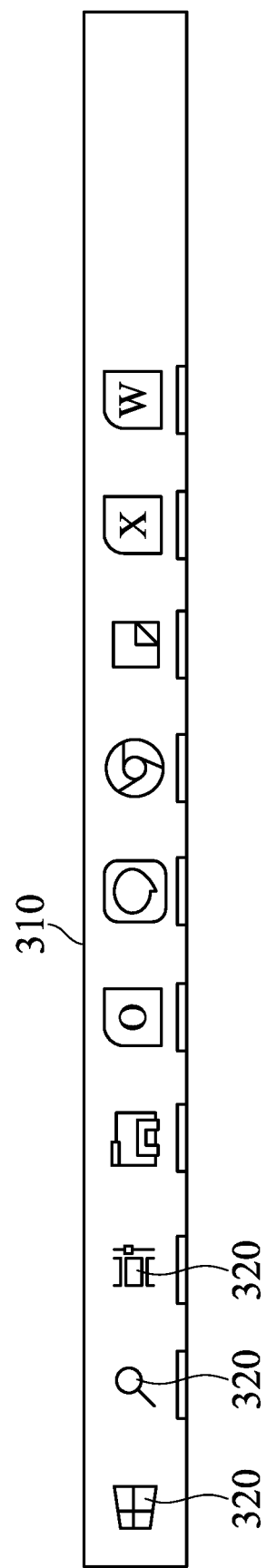

FIGS. 3A and 3B are diagrams of a desktop screen in accordance with an embodiment of the invention.

In the first embodiment, the host 100, for example, may execute the Windows operating system (such as Windows 2000 or subsequent versions), where the Windows operating system may display a taskbar that is static on the screen. For this type of static picture, the display panel 220 is quite prone to burn-in problems. Accordingly, the driver program 143 of the graphics processing unit 120 can change the size setting of the taskbar when a specific condition is satisfied. For example, the taskbar cannot always be displayed on the same region in the screen by making the taskbar larger or smaller, wherein the aforementioned specific condition may be that each time a fixed time (e.g., 30 minutes, 1 hour, etc., but not limited), a specific command is detected to cause the host 100 to enter a low-power state (e.g., state S3 or S4 in the Advanced Configuration and Power Interface (ACPI) standard), or a reboot operation of the host 100 is detected, but the invention is not limited thereto.

For example, the driver program 143 can continuously detect whether any of the above-mentioned specific conditions occur. If any specific condition is detected, the driver program 143 changes the taskbar settings, such as modifying the taskbar's settings of size, color, and brightness using a taskbar-format-change command. If the host 100 enters the S3 or S4 state, or there is a restart operation, when the host 100 returns to the working state or restarts to enter the working state, the processing unit 100 applies a new taskbar setting and redraws a new taskbar using the new taskbar setting, and the icon size in the new taskbar will be adjusted accordingly as the taskbar size changes. Specifically, although the driver program 143 can modify the taskbar settings, the size of the taskbar does not increase or decrease beyond a predetermined range, for example, it can be increase or decrease the height of 5 pixels to make it difficult for the user to perceive obvious movement of the toolbar, but the invention is not limited thereto.

Similarly, the setting of adjusting the color and brightness of the taskbar also allows the color and brightness of the pixels of the taskbar to be changed as a whole within the first predetermined range and the second predetermined range, respectively. For example, if the value of the red/green/blue sub-pixel of a specific pixel in the taskbar is (R1, G1, B1), the value of the changed red, green, blue sub-pixels will be between (R1±3, G1±3, B1±3), but the upper and lower limits are also 255 and 0, respectively, but the invention is not limited thereto.

In an embodiment, the predefined dimensions of the taskbar 310 and the icons 320 are shown in FIG. 3A. When the driver program 143 detects that any one of the aforementioned specific conditions occurs, the driver program 143 modifies the size setting of the taskbar through a taskbar-format-change command, such as reducing the size of the taskbar 310, as shown in FIG. 3B. It should be noted that the icons 320 in FIG. 3B will also become smaller as the size of the taskbar 310 decreases.

Figure 4A:
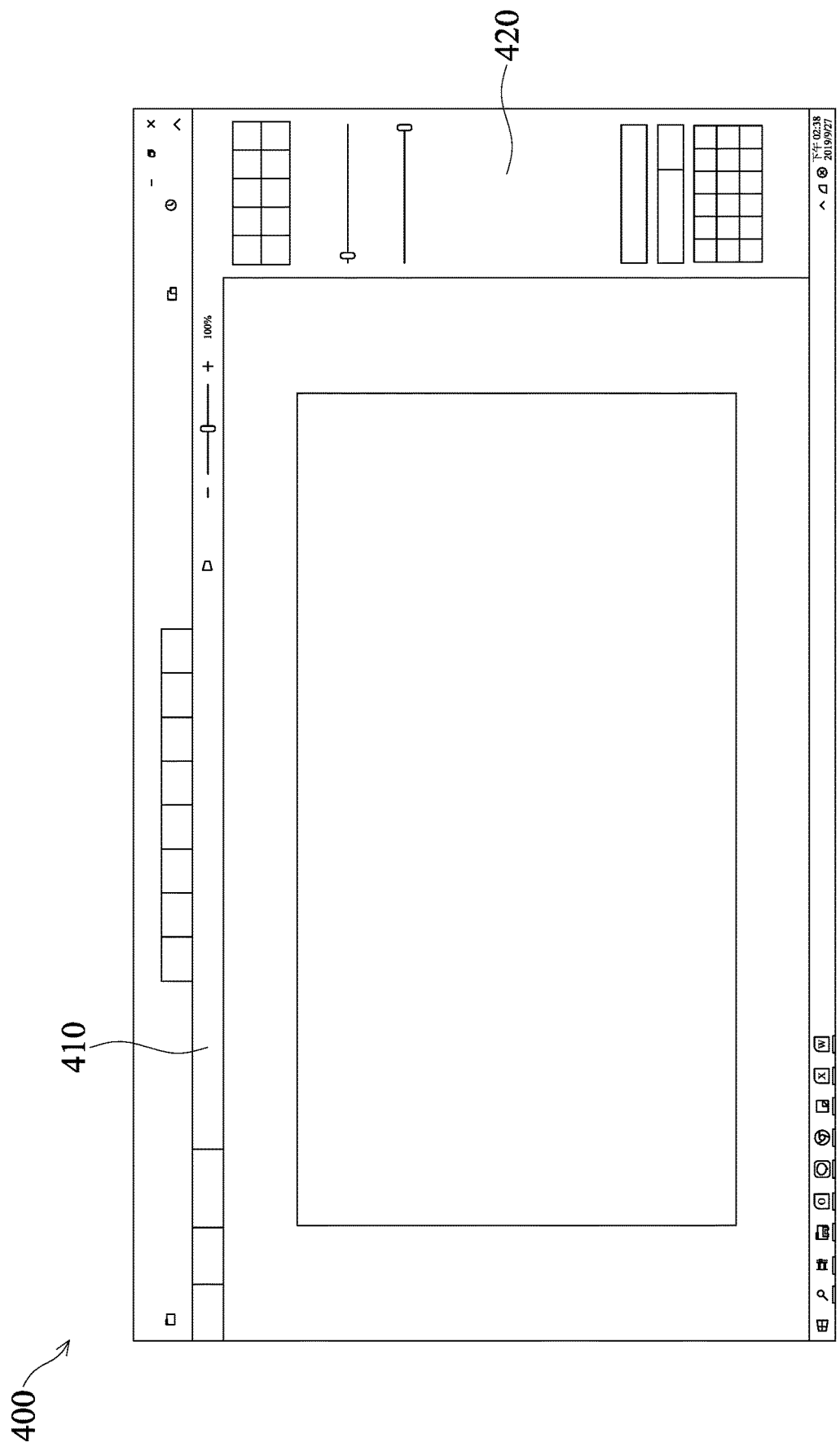
FIGS. 4A and 4B are diagrams of a user interface of a specific program in accordance with an embodiment of the invention.
Figure 4B:
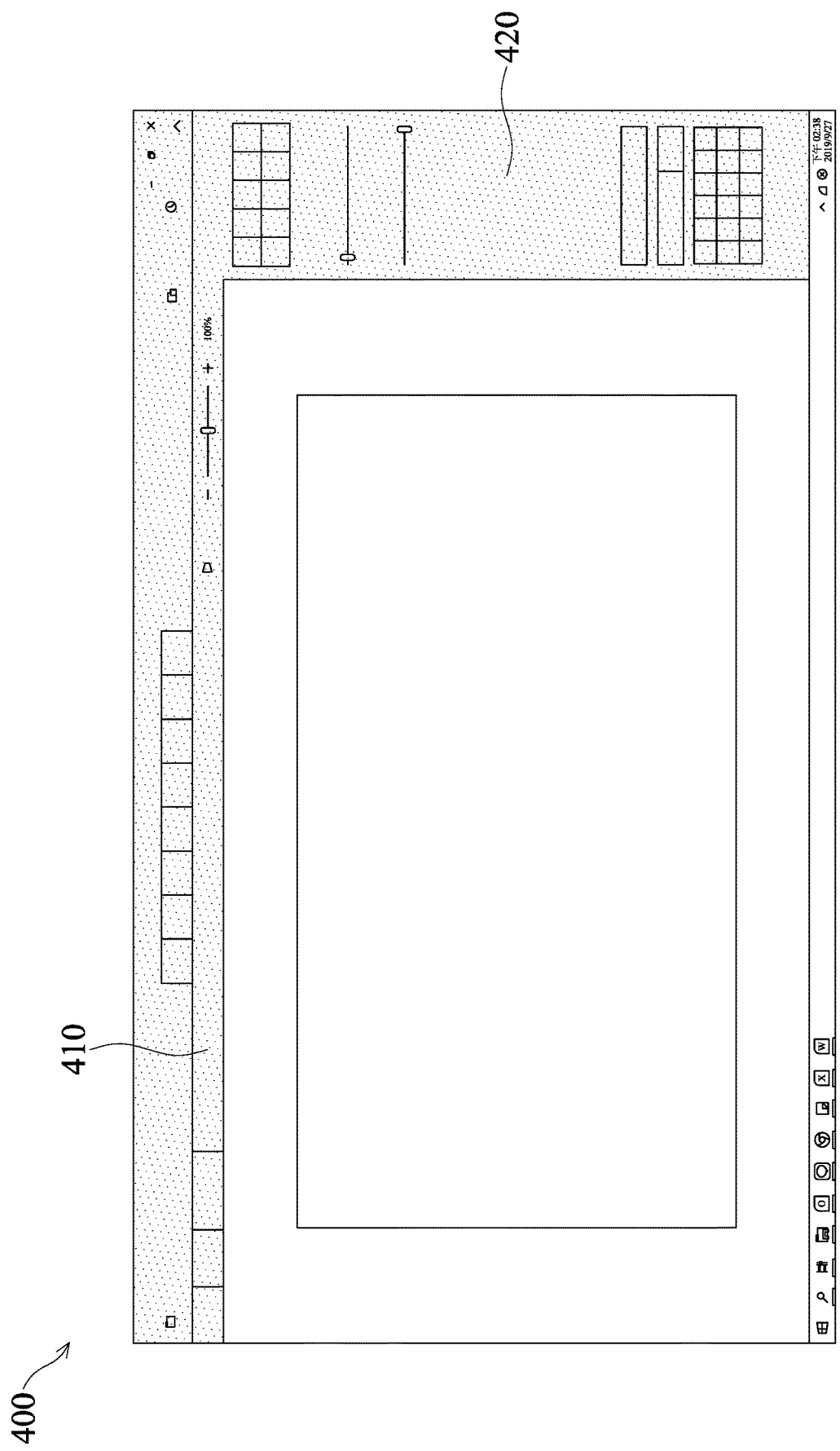

FIGS. 4A and 4B are diagrams of a user interface of a specific program in accordance with an embodiment of the invention.

In the second embodiment, the processing unit 110 of the host 100 may execute a specific program (e.g., the painter program in the Windows operating system) and the burn-in prevention program 144, wherein the user interface 400 of the specific program is shown in FIG. 4A. The user, for example, may select one or more specific areas to be prevented from the burn-in issue, such as areas 410 and 420 which respectively represent the upper toolbar and the right toolbar of the user interface 400, as shown in FIG. 4A.

After the selection is completed, the burn-in prevention program 144 may set the areas 410 and 420 as the burn-in-prevention area and performs a burn-in-prevention process, such as adjusting the brightness and/or color of the areas 410 and 420. The adjustment mechanism of the screen brightness and color is similar to that of the embodiments in FIGS. 3A and 3B, so details thereof will not be repeated here. After adjusting the brightness and/or color, the areas 410 and 420 are shown in FIG. 4B, wherein the areas 410 and 420 in FIG. 4B are illustrated using dots filled within them, so as to represent that the areas 410 and 420 in FIG. 4B are different from the upper toolbar and right toolbar of the original user interface 400 in FIG. 4A.

Additionally, in addition to using the burn-in-prevention program 144 to select the area of the user interface, the burn-in-prevention program 144 is also capable of automatically detect the specific program in the current window to determine the corresponding area for burn-in-prevention processing. For example, if the painter program of the Windows operating system is taken as an example, the burn-in-prevention program 144 may pre-store settings corresponding to the burn-in-prevention areas of the user interface of the painter program (e.g., pre-stored in the storage device 140), such as areas 410 and 420. When the burn-in-prevention program 144 detects that the painter program is currently executed in the current window, the burn-in-prevention program 144 may read the corresponding setting of the burn-in-prevention area from the storage device 140.

In another embodiment, the user can also select one or more specific area for burn-in prevention via the burn-in-prevention program 144, or use the burn-in-prevention program 144 to automatically detect the specific program of the current window to determine the corresponding area for burn-in-prevention process. When the burn-in-prevention program 144 detects that the painter program in the current window is running, the burn-in-prevention program 144 may read the settings corresponding to the burn-in-prevention areas of the user interface of the painter program, such as areas 410 and 420 that respectively represent the upper toolbar and right toolbar of the user interface 400, as depicted in FIG. 4A.

In the embodiment, the burn-in-prevention program 144 can generate, for example, a translucent window corresponding to the selected areas 410 and 420, such as a translucent window with low brightness or low chroma. The translucent window may have a transparency $\alpha$, which is a value between 0 and 1, and the size of the translucent window is approximately equal to the selected areas 410 and 420, and the translucent window covers the selected areas 410 and 420. At this time, the operating system 142 may overlay (superimpose) or blend the original toolbar screens of the selected areas 410 and 420 with the translucent window generated by the burn-in-prevention program 144, thereby generating the display images of the selected areas 410 and 420, as depicted in FIG. 4B.

It should be noted that because the burn-in-prevention program 144 covers a translucent window above the selected areas 410 and 420, the user cannot directly click the options of the toolbars on the original selected areas 410 and 420 when using the mouse to operate the cursor. For example, when the user clicks the range of the selected areas 410 and 420 for the first time using the mouse, the burn-in-prevention program 144 can remove the translucent window. The user may then click the options of the toolbars in the selected areas 410 and 420 for the second time using the mouse. The burn-in-prevention program 144 can also detect that when the selected areas 410 and 420 are not operated for more than a predetermined time (e.g., 3 minutes, but not limited), the burn-in-prevention program 144 will generate a translucent window to cover the range of the selected areas 410 and 420.

In the third embodiment, the host 100, for example, may also execute the painter program (e.g., the specific program) of the Windows operating system, and the graphics processing unit 120 can transmit the display images to the display controller 210 through the image-transmission channel between the transmission interfaces 150 and 250. When the burn-in-prevention program 144 detects that the painter program in the current window is currently running, the burn-in-prevention program 144 may transmit the execution status of the specific program to the display controller 210 through the data-transmission channel between the transmission interfaces 150 and 250. The storage unit 230, for example, may be storing the settings corresponding to the burn-in-prevention areas (e.g., these can be regarded as static areas) of the user interface of the specific program, such as areas 410 and 420. Thus, when the display controller 210 has received the execution status of the specific program, the display controller 210 may read the settings corresponding to the specific program that is pre-stored in the storage unit 230 to obtain the burn-in-prevention areas and their coordinates, thereby performing burn-in-prevention processing on the burn-in-prevention areas. The settings corresponding to the specific program may include converting the position information about the static area into corresponding settings of the burn-in-prevention area and its coordinates in the output image of the display panel 220.

In some other embodiments, the user may also select the burn-in-prevention area via the burn-in-prevention program 144, and the burn-in-prevention program 144 may transmit the position information about the selected burn-in-prevention area to the display controller 210 through the data-transmission channel between the transmission interfaces 150 and 250. Because the resolution of the image signal output from the host 100 to the display apparatus 200 is not necessarily identical to the resolution of the display panel 200, the display controller 210 may convert the position information about the static area to the corresponding burn-in-prevention area and its coordinates in the output image of the display panel 220, and perform burn-in-prevention processing on the burn-in-prevention area.

In yet some other embodiments, the storage device 140 can pre-store the settings corresponding to the static areas in the user interfaces of different programs. When the burn-in-prevention program 144 detects that a specific program in the current window is running, the burn-in-prevention program 144 may obtain the settings corresponding to the specific program that is pre-stored in the data storage device 140, such as position information about the static areas (e.g., toolbars), and transmit the position information about the selected area to the display controller 210 through the data-transmission channel between the transmission interfaces 150 and 250. Similarly, because the resolution of the image signal output from the host 100 to the display apparatus 200 is not necessarily identical to the resolution of the display panel 200, the display controller 210 may convert the position information about the static area to the corresponding burn-in-prevention area and its coordinates in the output image of the display panel 220, and perform burn-in-prevention processing on the burn-in-prevention area. In the aforementioned embodiment, the position information corresponding to the static area (or selected area), for example, may include coordinates of a plurality endpoints of the static area (or selected area) and/or width or height of the static area (or selected area) that can be expressed using a pixel distance.

Specifically, in the third embodiment, the display controller 210 may display a corresponding OSD mask on the screen of the burn-in-prevention areas, that correspond to the areas 410 and 420 of the display panel 220, wherein the OSD mask may be the uppermost layer among different image layers when the display controller 210 perform image overlaying, and can be used to reduce the brightness and/or change the color of the burn-in-prevention area. For example, the OSD mask may also have a transparency value, which is a value between 0 and 1, and the OSD mask can adjust the brightness and/or color of pixels in the burn-inprevention area as a whole within a predetermined range. The mechanism for adjusting the brightness and color can be referred to the embodiments of FIGS. 3A and 3B.

If the resolution of the image signal transmitted from the host 100 to the display apparatus 200 is identical to that of the display panel 220, the display panel 210 can superimpose the OSD mask in the burn-in-prevention areas on the screen of the original toolbar in the selected areas 410 and 420, thereby generating the display images of the selected areas 410 and 420, as shown in FIG. 4B.

Figure 5:
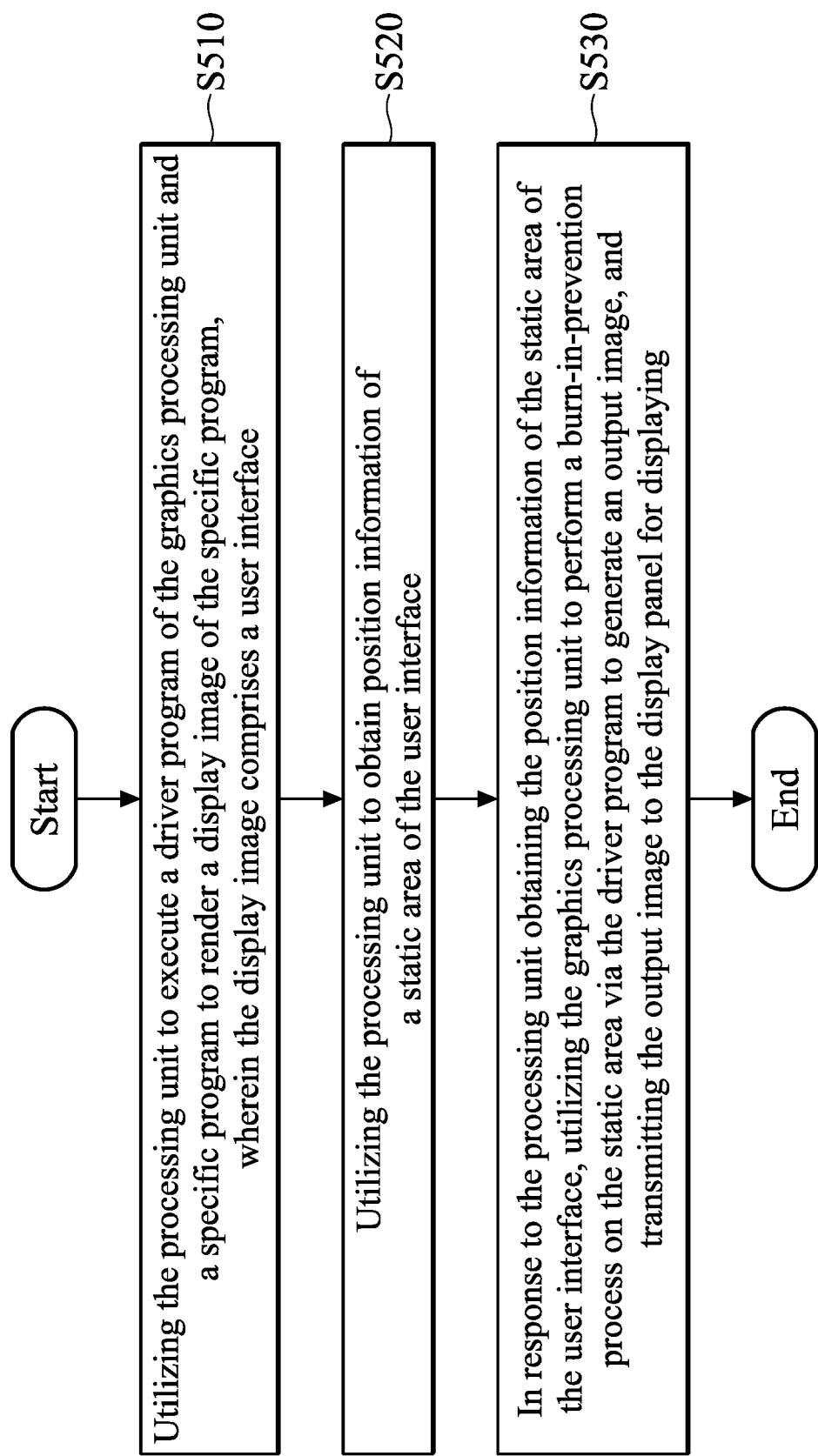
FIG. 5 is a flow chart of a burn-in-prevention method of a display apparatus in accordance with an embodiment of the invention.

FIG. 5 is a flow chart of a burn-in-prevention method for an electronic device in accordance with an embodiment of the invention.

In step S510, the processing unit 110 executes a specific program and a driver program of the graphics processing unit 120 to render a display image of the specific program, wherein the display image includes a user interface. For example, in the embodiments of FIGS. 4A and 4B, the user interface of the specific program may include toolbars in the areas 410 and 420, but the invention is not limited thereto.

In step S520, the processing unit 110 obtains the position information about the static area in the user interface. For example, the static area may be the areas 410 and 420 in FIGS. 4A and 4B.

In step S530, in response to the processing unit 110 obtaining the position information about the static area, the graphics processing unit 120 is utilized to perform a burn-in-prevention process on the static area through the driver program 143 to generate an output image. In addition, the burn-in-prevention process may be using the graphics processing unit 120 to generate a translucent window corresponding to the static area that has a transparency value between 0 and 1, and the graphics processing unit 120 may perform image blending on the translucent window and the image of the static area according to the transparency value to generate an output image. In addition, the burn-in-prevention process may also be using the driver program 143 to reduce the brightness of the pixels in the static area as a whole within a first predetermined range, and/or to adjust the values of the red, green, and blue subpixels of the pixels in the static area as a whole, where the details can be referred to the embodiments of FIGS. 4A and 4B.

Figure 6:
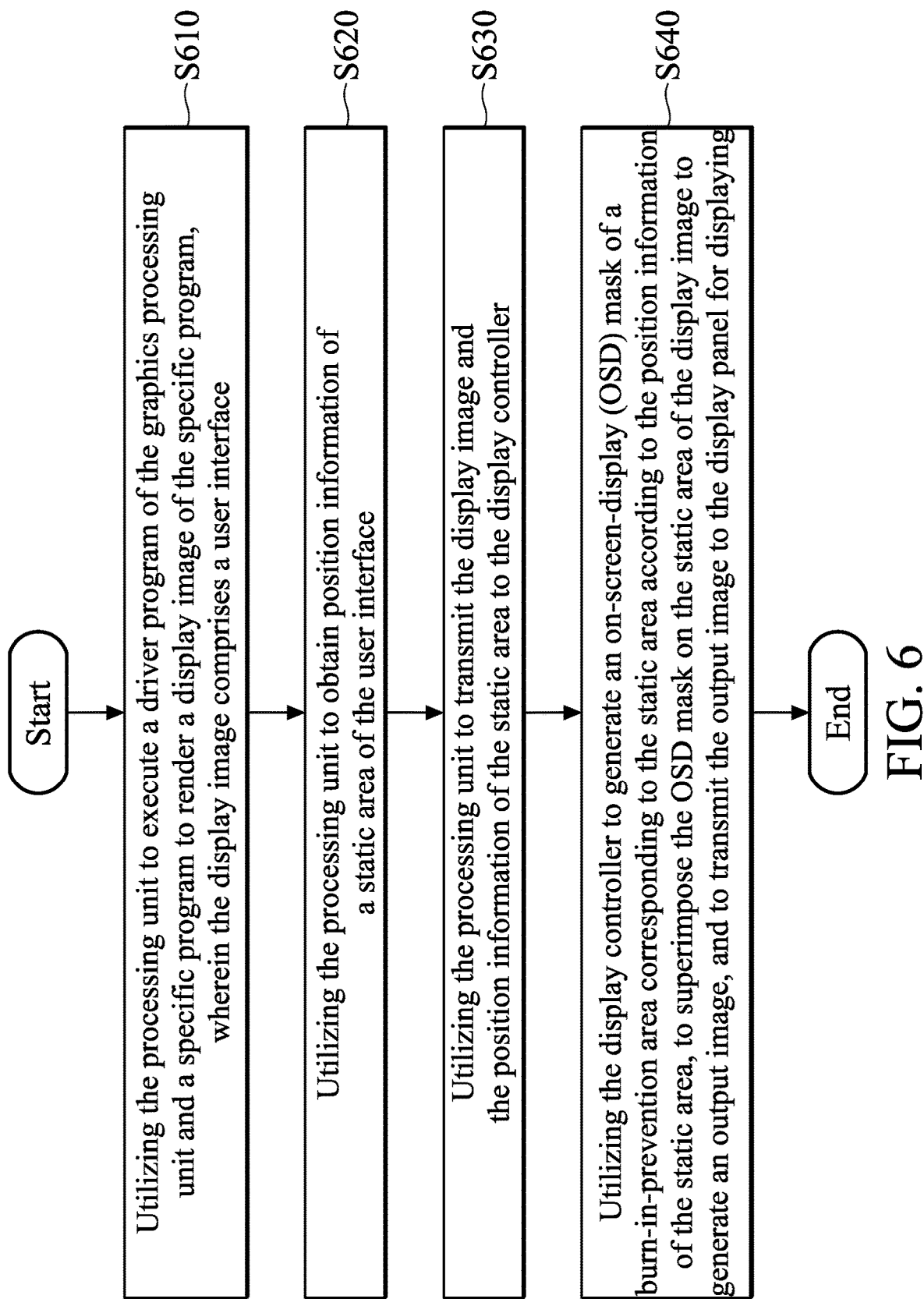
FIG. 6 is a flow chart of a burn-in-prevention method of a display apparatus in accordance with another embodiment of the invention.

FIG. 6 is a flow chart of a burn-in-prevention method for an electronic device in accordance with another embodiment of the invention.

In step S610, the processing unit 110 executes a specific program and a driver program of the graphics processing unit 120 to render a display image of the specific program, wherein the display image includes a user interface. For example, in the embodiments of FIGS. 4A and 4B, the user interface of the specific program may include toolbars in the areas 410 and 420, but the invention is not limited thereto.

In step S620, the processing unit 110 obtains the static area of the user interface. For example, the static area may be the areas 410 and 420 in FIGS. 4A and 4B. In addition, the processing unit 110 may automatically detect the static area in the user interface, or detect the type of the program and read the setting thereof, or obtain the information about the area manually selected by the user for burn-in prevention.

In step S630, in response to the processing unit 110 obtaining the position information about the static area, the processing unit 110 transmit the position information about the static area to the display controller 210. For example, the position information corresponding to the static area (or selected area), for example, may include coordinates of a plurality endpoints of the static area (or selected area) and/or width or height of the static area (or selected area) that can be expressed using a pixel distance.

In step S640, the display controller 210 generates an OSD mask of a burn-in area corresponding to the static area according to the position information about the static area, and overlays the OSD mask and the display image to generate an output image, and transmits the output image to the display panel 220 for displaying.

In view of the above, an electronic device and a method of burn-in prevention for an electronic device are provided. The electronic device and the method are capable of performing burn-in prevention processing on the static area of the display image from the host, such as adjusting the brightness and/or color of the static area, thereby reducing the occurrence of the burn-in condition on the display panel caused by the display panel displaying a static area for a long time.

The use of terms such as "first", "second", and "third" in claims is used to modify elements in the claims, and is not used to indicate that there is a priority order, antecedent relationship, or Is an element preceded by another element, or a chronological order when performing a method step, only used to distinguish elements with the same name.

While the invention has been described by way of example and in terms of the preferred embodiments, it should be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An electronic device, comprising:
a display apparatus, comprising a display controller and a display panel; and
a host, electrically connected to the display panel, wherein the host comprises a processing unit and a graphics processing unit;
wherein the processing unit executes a driver program of the graphics processing unit and a specific program to render a display image of the specific program, and the display image comprises a user interface,
wherein the processing unit obtains position information about a static area of the user interface, and transmits the display image and the position information about the static area to the display controller,
wherein the display controller generates an on-screen-display (OSD) mask of a burn-in-prevention area corresponding to the static area according to the position information about the static area, superimposes the OSD mask on the static area of the display image to generate an output image, and transmits the output image to the display panel for displaying.

2. The electronic device as claimed in claim 1, wherein the OSD mask has a transparency value between 0 and 1, and the display controller performs image blending on the OSD mask and the image of the burn-in-prevention area according to the transparency value to generate the output image.

3. The electronic device as claimed in claim 1, wherein the display controller uses the OSD mask to reduce brightness of pixels in the static area as a whole within a first predetermined range, and/or to adjust values of red subpixels, green subpixels, and blue subpixels of the pixels in the static area as a whole within a second predetermined range.

4. A method of burn-in prevention for an electronic device, wherein the electronic device comprises a display apparatus and a host, and the display apparatus comprises a display panel and a display controller, and the host comprises a processing unit and a graphics processing unit, the method comprising:
- utilizing the processing unit to execute a driver program of the graphics processing unit and a specific program to render a display image of the specific program, wherein the display image comprises a user interface;
- utilizing the processing unit to obtain position information about a static area of the user interface, and to transmit the display image and the position information about the static area to the display controller; and
- utilizing the display controller to generate an on-screen-display (OSD) mask of a burn-in-prevention area corresponding to the static area according to the position information about the static area, to superimpose the OSD mask on the static area of the display image to generate an output image, and to transmit the output image to the display panel for displaying.

5. The method as claimed in claim 4, wherein the OSD mask has a transparency value between 0 and 1, and the method further comprises:
- utilizing the display controller to perform image blending on the OSD mask and the image of the burn-in-prevention area according to the transparency value to generate the output image.

6. The method as claimed in claim 4, further comprising:
- utilizing the display controller to use the OSD mask to reduce brightness of pixels in the static area as a whole within a first predetermined range, and/or to adjust values of red subpixels, green subpixels, and blue subpixels of the pixels in the static area as a whole within a second predetermined range.

* * * * *